US010496827B1

(12) United States Patent
Ridner et al.

(10) Patent No.: US 10,496,827 B1
(45) Date of Patent: Dec. 3, 2019

(54) RISK ANALYSIS METHOD AND SYSTEM

(71) Applicant: Clearwater Compliance LLC, Hendersonville, TN (US)

(72) Inventors: R. Gary Ridner, Goodlettsville, TN (US); Jonathan D. Stone, Franklin, TN (US); Curtis R. Miller, Dulles, VA (US); Gary W. Coker, Birmingham, AL (US)

(73) Assignee: CLEARWATER COMPLIANCE, Hendersonville, TN (US)

( * ) Notice: Subject to any disclaimer, the term of this patent is extended or adjusted under 35 U.S.C. 154(b) by 0 days.

(21) Appl. No.: 16/381,306

(22) Filed: Apr. 11, 2019

(51) Int. Cl.
G06F 21/57 (2013.01)
G06Q 10/06 (2012.01)
G06F 3/0482 (2013.01)

(52) U.S. Cl.
CPC .......... *G06F 21/577* (2013.01); *G06F 3/0482* (2013.01); *G06Q 10/0635* (2013.01); *G06F 21/57* (2013.01); *G06Q 10/06* (2013.01)

(58) Field of Classification Search
CPC ........ G06F 21/57; G06F 21/577; G06F 21/10; G06F 3/04; G06F 3/0482; G06F 19/3418; G06Q 10/06; G06Q 10/0635; H04L 63/1433
USPC ......... 726/25; 715/838; 705/35, 36, 38, 7.28
See application file for complete search history.

(56) References Cited

U.S. PATENT DOCUMENTS

| | | | | |
|---|---|---|---|---|
| 7,124,101 B1* | 10/2006 | Mikurak | ............... | G06Q 10/06 705/35 |
| 2005/0065807 A1* | 3/2005 | DeAngelis | ......... | G06Q 10/0635 705/7.28 |
| 2006/0218639 A1* | 9/2006 | Newman | ................. | G06F 21/10 726/25 |
| 2008/0082380 A1* | 4/2008 | Stephenson | ............ | G06Q 10/06 726/25 |
| 2009/0070253 A1* | 3/2009 | Gavin | ................ | G06Q 10/0635 705/38 |
| 2009/0228316 A1* | 9/2009 | Foley | ................. | G06Q 10/0635 705/7.28 |
| 2011/0001605 A1* | 1/2011 | Kiani | .................... | G06F 3/0482 340/5.6 |
| 2011/0214091 A1* | 9/2011 | Nicol | .................... | G06F 3/0482 715/838 |
| 2012/0221485 A1* | 8/2012 | Leidner | ............. | G06Q 10/0635 705/36 R |

(Continued)

OTHER PUBLICATIONS

Creating a Threat Profile for Your Organization by Stephen Irwin, SANS Institute Sep. 8, 2014 pp. 32 (Year: 2014).*

(Continued)

*Primary Examiner* — Jeffrey C Pwu
*Assistant Examiner* — Ali H. Cheema
(74) *Attorney, Agent, or Firm* — Wyatt, Tarrant & Combs, LLP; Max E. Bridges; Matthew A. Williams

(57) ABSTRACT

A risk analysis system and method that groups the attributes or components of assets together if the components face the same threats and vulnerabilities based upon the components, component properties, property values, and security controls of the asset. The risk analysis system and method creates different component groups if the components face different security risks. The risk analysis system and methods provides a more efficient, robust, detailed, and user friendly risk analysis.

11 Claims, 13 Drawing Sheets

(56) References Cited

U.S. PATENT DOCUMENTS

2012/0221486 A1\* 8/2012 Leidner ............. G06Q 10/0635
                                                    705/36 R
2017/0048266 A1\* 2/2017 Hovor ................. H04L 63/1433
2019/0166149 A1\* 5/2019 Gerrick .............. H04L 63/1433

OTHER PUBLICATIONS

SANS Institute (NPL: Creating a threat profile for your organization by Stephen Irwin, Sep. 8, 2014) pp. 32 (Year: 2014).\*

\* cited by examiner

Component Types

Select all items that create, receive, store, transmit or view sensitive information.
Expand all categories  Collapse all categories

| | | |
|---|---|---|
| ∧ Backup ⓘ | 0 selected | Server A physical or virtual device (i.e. Virtual Machine or VM) used to host programs or data for use by other devices, referred to as clients, or for other programs. |
| ∧ End User Devices ⓘ | 3 selected | Application An application is a self-contained program that performs a specific function. Most applications include or access an integrated database to store the application's data. Example includes: Electronic Medical Records |
| ∨ Infrastructure ⓘ | 1 selected | Internal User Type Individuals who are employed by or otherwise associated with (e.g. students, providers, volunteers, etc.) an organization who may use or view its systems and data. |

☐ Audio Recording System  ☐ Platform-as-a-Service
☐ Disk Array              ☒ Server
☐ External Disk Storage   ☐ Video Recording System
☐ Network Device

| | |
|---|---|
| ∧ Management ⓘ | 0 selected |
| ∧ Medical Devices ⓘ | 0 selected |

RISK ANALYSIS METHOD AND SYSTEM

FIELD OF INVENTION

The embodiments described herein relate to providing risk analyses and risk management of an organization's information systems, particularly electronics that store sensitive information. The risk analysis methods of the present embodiments provide for grouping the attributes, or components, of assets together that face similar threats and vulnerabilities so that these groups may be risk analyzed together. The risk analysis methods of the present embodiments further create unique component groups if the components in them face different security risks. The embodiments herein provide for more efficient, robust, and user-friendly risk analyses of relevant system risks.

BACKGROUND

As the world becomes more digitized and interconnected, individuals, businesses, governments, and others face increasing threats from cyberattacks. In recent years, both the cost and the severity from cyberattacks continues to grow at an alarming rate. For example, some reports suggest that the global cost of cybercrime grew from $445 billion in 2014 to as much as $600 billion in 2017. Reports also suggest that cyberattacks are becoming progressively destructive and are targeting a broadening array of information.

Furthermore, in the United States and other nations, certain entities (especially those that create, receive, maintain and transmit protected health information) are required by law to conduct security risk analyses. For example, the U.S. Department of Health and Human Services has promulgated regulations that require covered entities and business associates to implement policies and procedures to prevent, detect, contain, and correct security violations of protected health information. These federal regulations require certain entities to "conduct an accurate and thorough assessment of the potential risks and vulnerabilities to the confidentiality, integrity, and availability of electronic protected health information . . . ," to implement security measures sufficient to reduce risk and vulnerabilities to a reasonable level, to apply and enforce sanction policies, and to implement regular information system reviews. See e.g. 45 § CFR 164.308(a)(1).

In addition to health care providers, many other entities have a need for conducting risk analyses and implementing risk management solutions to enable them to reduce the likelihood of a breach. As a non-limiting example, medical device manufactures are required to comply with the Privacy, Breach Notification, and Security Rules found in the Health Insurance Portability and Accountability Act ("HIPAA"). In the mergers and acquisition context, business entities often desire a thorough risk analysis to determine excessive risk posed by cyberattacks before making a large investment and/or following a merger/acquisition. Due to the sensitive nature of information in their possession, law firms also require risk analyses of their cybersecurity measures. It will be appreciated that any number of entities and/or individuals desire risk analysis and risk management to increase cybersecurity protections.

Accordingly, there is an increasing need, particularly for those that store sensitive information on electronic devices, to understand where cybersecurity exposures are located, to determine which of these exposures face the greatest risk, and where to focus one's cybersecurity resources. Herein, the term "user" describes an individual, entity, or organization that desires to conduct a risk analysis of an information system. Herein, the terms "information systems" and "assets" are used interchangeably to describe a user's resources that create, receive, store, and transmit electronic information.

It is known that risk analysis methods, systems, and software applications implementing computer-readable media can be utilized to analyze the threats and vulnerabilities posed to an organization's assets. However, conventional risk analysis methods, systems, and software applications are not sufficiently robust and do not provide the user with the specific properties of an asset that present risk. Further, the conventional risk analysis methods do not break down an organization's assets into its constituent parts. Instead, in the typical risk analysis method or system, it is entirely up to the user to determine the specific attributes of their organization's asset that present risk. This presents a particular challenge when trying to identify cyberattack vulnerabilities. For example, if a conventional risk analysis method identifies an asset with a weak password, it is difficult to know if the specific weak password risk is posed by the application, the network, or the device. As a result, this deficiency makes it difficult to implement appropriate risk controls.

Conventional risk analysis methods, systems, and software applications implementing computer-readable media present a number of other disadvantages, such as the inability to group components together based on common risks that they face and the common security controls that protect the components. For example, if a user desires to analyze the risk vulnerabilities of a system which comprises five hundred different servers and two hundred of these servers have the exact same risk profile (e.g. these 200 servers had the same operating system and same security controls), the conventional risk analysis method requires the user to separately analyze the risk of all 500 servers even though 200 servers face identical threats. This shortcoming makes the conventional risk analysis method more time consuming and inefficient.

Conventional risk analysis methods, systems, and software applications are also unable to associate multiple components of the same type (e.g. server, desktop, etc.) with a single asset (e.g. a billing system, electronic medical records, etc.). Instead, this can only be accomplished in the conventional risk analysis method or system by creating another asset, often referred to as a "pseudo-asset," that is given a particular name to identify its association with another asset. For example, if two Storage Area Network (SAN) devices support a single system wherein one serves as Production Data storage and the other acts as a backup to the Production SAN, the typical risk analysis method requires the user to set up a "pseudo-asset" for the backup SAN (such as "Asset XYZ Backup") in order to analyze the risks posed to these two components.

Accordingly, there is a significant need for a risk analysis method that facilitates the breakdown of an asset into various components to allow risks to that asset to be analyzed at an appropriately granular level. Likewise, there is a need to group similar components from different assets together for risk analysis based on the common risks that they face. Such an improvement would permit the risk analysis process to be much more efficient and less time-consuming than the conventional method which requires each component to be analyzed individually. There is also a need for a risk analysis method that allows multiple components of the same type but with slightly different properties or cybersecurity control settings (i.e. servers operating with a Windows™ operating system versus servers operating with a Linux™ operating system), to be associated with the same asset and to be risk analyzed separately from other components because they face different risks. Along with other features and advantages outlined herein, risk analysis methods within the scope of present embodiments meet these and other needs by providing a technical solution to the technical problem posed by the conventional risk analysis methods and systems. In doing so, the risk analysis methods within the scope of present embodiments provide more robust risk analyses, provide faster and more efficient risk analyses, and provide a more user-friendly definition of the risk profile for assets.

SUMMARY OF EMBODIMENTS

This disclosure describes implementations of systems, devices, methods and computer-readable media for grouping the attributes, or components, of assets together that face similar threats and vulnerabilities such that these groups may be analyzed together for risk management purposes. The risk analysis methods of the present embodiments further provide for the creation of unique component groups if the components face different security risks. The present embodiments provide faster and more efficient risk analyses, provide a more robust and accurate risk analysis, improve the implementation of risk management practices, and provide technical solutions to the technical problems posed by the conventional risk analysis methods, systems, and software applications implementing conventional computer-readable media.

Herein the term "user" describes an individual, entity, or organization that desires to conduct a risk analysis of an information system. Herein, the terms "information systems" and "assets" are used interchangeably to describe a user's resources that receive, store, and transmit electronic information.

Herein, the term "components" represents the constituent parts of a user's assets. The term "components" represents the "who," the "what," and the "where" that comprise an asset. For example, the "who" might include users that view or enter data into an information system and administrators that maintain the system. The "what" might include the software that is utilized, the servers and storage devices that support the software, the workstations that access this software, etc. The "where" might include the location where the servers and storage devices are housed, the location of backup tapes, and so forth.

Herein, "component categories" represent different categories of components to facilitate the selection of different components. In some embodiments, component categories consist of backup, end user devices, infrastructure, management, medical devices, networks, people, and software.

Herein, the term "component properties" represents the various attributes of a component such as physical location, operating system, data type, etc. The term "property value" represents additional attributes for describing a "component property." For example, a component property comprising "data type" might further comprise property values consisting of payment card access, personally identifiable information, personal health care information, internal use only, and others. According to multiple embodiments and alternatives, the risk analysis method identifies different component properties for each particular component. In a non-limiting example, servers will have different component properties than applications.

In the embodiments described herein, the term "component group" represents a group of components that face the same cybersecurity risks and vulnerabilities, and thus, according to multiple embodiments and alternatives, are grouped together for purposes of risk analysis and management. In some embodiments, a component group may consist of components of the same type that are grouped together for risk management purposes, even though the components might belong to different assets.

Herein, the term "controls" refers to the security controls utilized to mitigate and manage cybersecurity threats posed to a component. As will be appreciated by one of ordinary skill in the art, different security controls are applicable to different components. For illustrative and non-limiting purposes, security controls might include anti-malware software, data backup, encryption of disks (full disk, file based, etc.), operating system patching, surge protectors, and others.

The risk analysis method and system, according to multiple embodiments and alternatives, is based on the principle that component properties represent different types of cybersecurity risk and security controls represent safeguards protecting components against cybersecurity risk. If components have different component properties and different controls, then the components face different levels of cybersecurity risk (i.e. different threats and vulnerabilities and different degrees of susceptibility to those threats and vulnerabilities). However, if components have the same component properties and the same controls, then the components face the same level of cybersecurity risk. Accordingly, when components face the same level of cybersecurity risk, the components can be grouped into a component group for purposes of performing risk analysis and risk management.

According to multiple embodiments and alternatives, the risk analysis method and system includes a database consisting of a list of component categories, components belonging to each component category, component properties corresponding to each component, and property values corresponding to each component property. In some embodiments, the risk analysis method prompts a user to analyze the risk of a particular asset at an appropriately granular level by first providing the user the list of component categories. From within each component category, the user selects all of the components that are applicable to the asset at issue and the user's selections are received into the risk analysis system. Next, the risk analysis method and system provide the user with component properties corresponding to each selected component. The user then selects property values for each selected component, and the selected property values are received into the risk analysis system.

According to multiple embodiments and alternatives, the risk analysis system and method then suggests component groups to the user based on the user's selections. According to multiple embodiments and alternatives, the user will repeat the selection method for each asset, then the asset's components will be appropriately grouped for risk management purposes. In some embodiments, if a component's property values are identical to those of an existing component group, then the component is placed into the same component group because the components face identical threats and vulnerabilities. If a component's property values are not identical, the component is placed into a different component group because the threats and vulnerabilities are not the same. Accordingly, in some embodiments the risk analysis method uses a binary approach to create component groups: either the risks are identical and the matching component is placed into an existing component group, or the risks are different (no matter how small the difference) and a separate component group is created for this new component.

In some embodiments, a user can modify the system's suggested component groups to better reflect the risk. For example, if the system suggests separate component groups for volunteers and full-time employees, the user can modify the system's suggested component group to create a single component group for the volunteers and the full-time employees. With this feature, the system allows the user to account for the fact that both volunteers and employees receive the same cybersecurity training and undergo the same background checks.

According to multiple embodiments and alternatives, the risk analysis system includes a list of security controls used to protect the various component types. After the component groups are created, the system will prompt the user to select the security controls that are implemented for each component group, and then the selection of security controls are received into the system. If the user's selections (i.e. security control settings) indicate different security controls are being implemented for components within a single component group (e.g. one component has anti-malware installed but another does not), the risk analysis system and method suggests and creates different component groups to account for the different level of protection from cybersecurity risk posed by these differences. In this manner, one of ordinary skill in the art will appreciate that the risk analysis system and method monitors when a user changes component property values and control settings, and in some embodiments, creates and suggests new component groups accordingly. In some embodiments, component groups consist only of components with identical threats and vulnerabilities, which are identified when the user selects the components, component properties, property values, and security controls applicable to the particular asset.

As a non-limiting example of the risk analysis method and system, a user's assets might include a billing system, an electronic medical records ("EMR") application, and a picture archiving and communication system ("PACS"). After reviewing the list of components provided by the risk analysis system, a user might determine that the components of all three assets include an application and a server. According to multiple embodiments and alternatives, the server components for these three assets are initially grouped together in the same component group. The risk analysis method according to present embodiments then allows users to provide more detail about each component in this component group by providing the user with component properties and property values. In some embodiments, the component properties of the server might include an "operating system," and the risk analysis method prompts and receives user input to determine whether the servers are configured differently from one another. In this non-limiting example, the servers of both the billing system and PACS might run a Windows™ operating system while the EMR application's servers use a Linux™ operating system. Accordingly, in this non-limiting example, the threats and vulnerabilities to the servers are different and as a result they cannot be placed into a single component group for risk management purposes. Because the risks are different for Windows™ servers versus Linux™ servers, the risk analysis method places the servers into different component groups using component properties and property values. In some embodiments, the risk analysis method and system further prompt the user to select the security controls being implemented for the various component groups, and the system creates additional component groups if the various security controls differ for components within a component group.

According to multiple embodiments and alternatives, the risk analysis method and system provides an appropriately granular risk analysis of an asset by allowing the user to identify the components that comprise each asset and allowing the user to analyze the specific risks to each component based on its properties (i.e. property values) and the security controls in place to protect them. This feature is a significant improvement and advantage over conventional risk analysis methods, which do not provide the user with an appropriate method of identifying all of the different aspects of an asset (e.g. who uses it, where is it used, what devices support its use, etc.) that pose different risks to it. Furthermore, in conventional risk analysis methods, it's entirely up to the user to determine the differences in risk between components because conventional risk analysis methods do not provide the user with detailed lists of component categories, components, component properties, property values, or security controls. Moreover, the risk analysis method and system of the present embodiments creates component groups based on the identical risks that components face. This feature permits the risk analysis process to be much more efficient, user-friendly, and accurate as compared to the conventional risk analysis method which analyzes each component individually. Likewise, the risk analysis method in present embodiments allows for multiple components of the same type but with slightly different properties or control settings (i.e. servers with different operating systems), to be associated with the same asset while providing a separate risk analysis for evaluating each component independently.

BRIEF DESCRIPTION OF THE FIGURES

The drawings and embodiments described herein are illustrative of multiple alternative structures, aspects, and features of the present embodiments, and they are not to be understood as limiting the scope of present embodiments. It will be further understood that the drawing figures described and provided herein are not to scale, and that the embodiments are not limited to the precise arrangements and instrumentalities shown.

FIG. 5 is shows a portion of the user interface display of the risk analysis method and system, according to multiple embodiments and alternatives.

FIG. 7 is shows a portion of the user interface display of the risk analysis method and system, according to multiple embodiments and alternatives.

MULTIPLE EMBODIMENTS AND ALTERNATIVES

Figure 1:
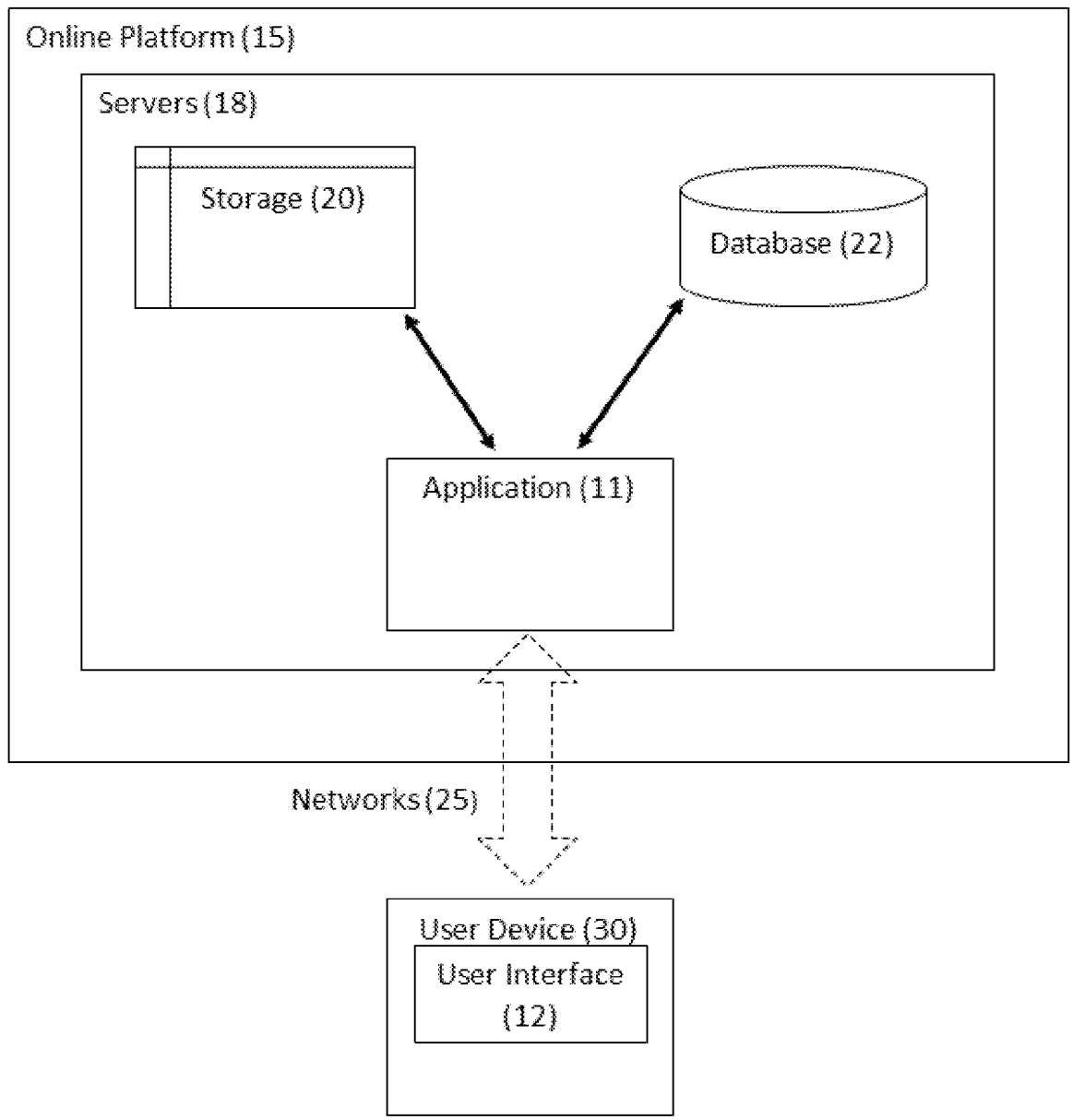
FIG. 1 is a block diagram illustrating a computer architecture to implement the risk analysis method and system, according to multiple embodiments and alternatives.

According to multiple embodiments and alternatives, a risk analysis method and system 5 is implemented via application 11 of a computer architecture 10 (illustrated in FIG. 1). In some embodiments, the application 11 is accessible to a user with an internet connection via an online platform 15. For illustrative (and non-limiting purposes), the online platform 15 is a cloud computing platform such as Amazon Web Services®, Google App Engine®, and Apple iCloud®. In some embodiments, the online platform 15 comprises servers 18, storage 20, database 22 and networks 25. In some embodiments, user interface 12 of user device 30 communicates with application 11 via an internet connection and/or networks 25 as illustrated by the dashed line in FIG. 1. In this manner, the user interface 12 both provides user input to the application 11 and provides the user with output from application 11. One of ordinary skill in the art will appreciate that various kinds of computer architectures may be selected, such as a stand-alone application that can be downloaded to a user's device.

As discussed in more detail below, application 11 implements the risk analysis method and system 5 by providing the user (via the user interface 12) with component categories 33, components 35, component properties 40, property values 42, and security controls 48. Next, the user selects the components 35 applicable to the asset being analyzed, and then selects the component's property values 42 and security controls 48. Via the user interface 12, the risk analysis method and system 5 then receives the user's selection of components 38, selection of property values 45, and selection of security controls 50 and generates component groups 52, each comprising a set of components that face the same cybersecurity risks and vulnerabilities, thus facilitating an efficient and detailed risk analysis and management.

Figure 2:
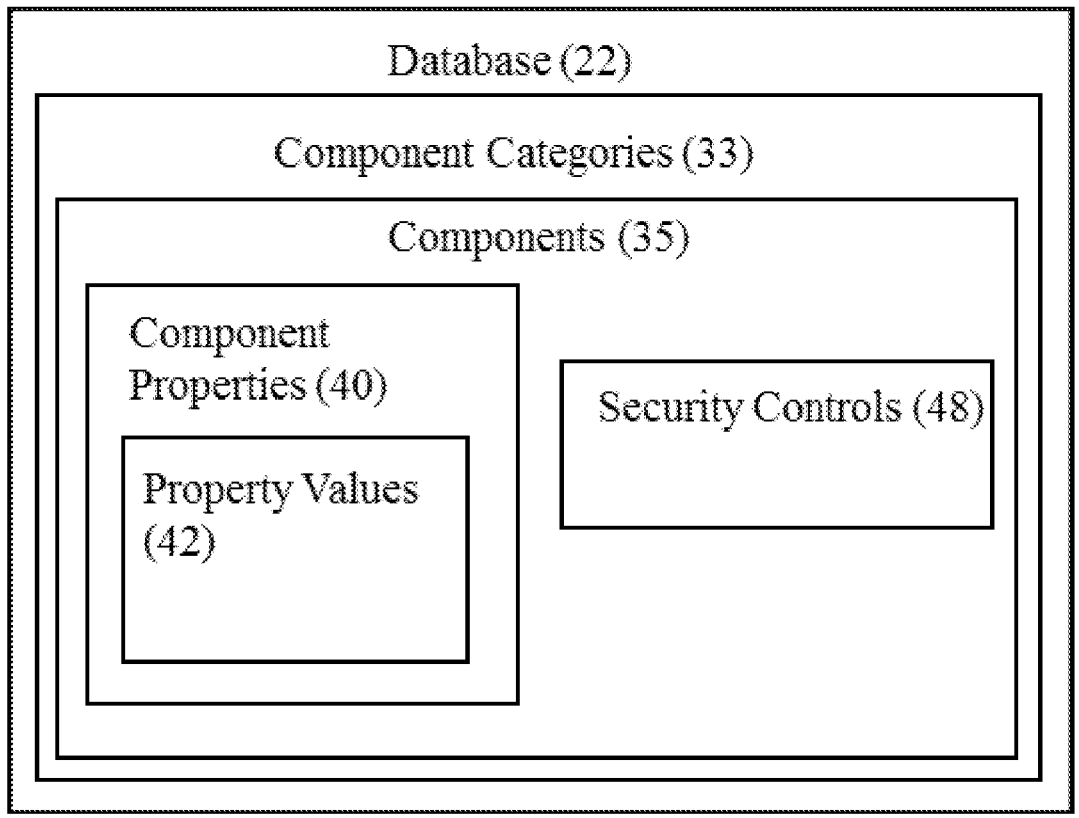
FIG. 2 is a block diagram illustrating a database of the risk analysis method and system, according to multiple embodiments and alternatives.

As illustrated in FIG. 2, in some embodiments application 11 includes database 22 comprising component categories 33, components 35 which have been assigned to specific component categories 33, component properties 40 which have been assigned to specific components 35, property values 42 which have been assigned to specific component properties 40, and security controls 48 which have been assigned to specific components 35. As discussed in more detail below, when a user utilizes the risk analysis method and system 5, the application 11 retrieves the various component categories 33, components 35, security controls 48, component properties 40, and property values 42 from database 22 and provides these attributes to the user.

As will be appreciated by one of ordinary skill in the art, database 22 may be stored in memory 16 of online platform 15 via one or more computer-readable storage media such as an electronic storage medium, a magnetic storage medium, an optical storage medium, a quantum storage medium, a mechanical computer storage medium, and so forth. In addition, memory 16 may provide storage of computer-readable instructions that may describe database 22, application 11, user interface 12, the processes, and other data for implementing the risk analysis method and system 5 as discussed herein. In some embodiments, memory 16 may provide storage of computer-readable instructions or other information in a non-transitory format. When executed by a processor, the computer-readable instructions instruct the processor to perform certain actions. In some embodiments, the memory 16 includes modules that operate to compile source code, execute tests, and perform other actions to build the application 11. Memory 16 may also include modules such as user authentication or access control.

To conduct an appropriately granular risk analysis, the risk analysis method and system 5 provides the user with a detailed list of attributes that represent risk to an asset. According to multiple embodiments and alternatives, the risk analysis method and system 5 provides this detailed risk analysis by utilizing database 22 that comprises component categories 33, components 35, component properties 40 that have been assigned to particular components 35, property values 42 that have been assigned to particular component properties 40, and security controls 48 applicable to particular components 35 (see FIG. 2). As detailed below, the user then selects the components 35, and sets the property values 42 and security controls 48 applicable to the particular asset being analyzed by the user for cybersecurity threats.

In some embodiments, component categories 33 consist of backup, end user devices, infrastructure, management, medical devices, networks, people, and software. According to multiple embodiments and alternatives, the "backup" component category consists of the media and devices used for secondary storage of the organization's programs and data, such as tapes, CDs, diskettes, etc. The "end user devices" component category consists of devices employed by users to access or create an organization's data or to output this data in an electronic or printed form. The "infrastructure" component category consists of an organization's centralized information system processing, storage, and communications services. The "management" component category entails the assessment, organization, and administration of the organization's information system security controls and operations. The "medical devices" component category consists of any device or healthcare product intended for use in the diagnosis of disease or other condition, or for use in the care, treatment or prevention of disease, which does not achieve any of its primary intended purposes by chemical action or by being metabolized. The "networks" component category consists of a group of computer systems and other computing hardware devices that are linked together through communication channels to facilitate communication and resource-sharing among a wide range of users. The "people" component category consists of individuals employed by, contractually engaged by, or otherwise associated with an organization who may use or view its systems and data. The "software" component category consists of programs that instruct a computer what to do or store, manage, and retrieve information.

In some embodiments, application 11 provides the user with the descriptions of components 35 to assist the user in selecting the appropriate attribute. For example, in FIG. 5, the user interface provides the user with descriptions of a server, an application, and an internal user type.

As shown in Table 1, database 22 also includes component categories 33 and additional components 35 to provide the user with an appropriately granular risk analysis and a specific set of component properties 40 that are assigned to each component 35 (as shown by component property 40 that is in the same row as the component 35). Database 22 may also include descriptions of each component 35 or component property 40 that can be retrieved by application 11 and provided to the user via user interface 12 to guide the user through the risk analysis method and system 5.

TABLE 1

Component Categories, Components, Component Properties, and Descriptions.

| Component Categories (33) | Components (35) | Component Properties (40) | Descriptions |
|---|---|---|---|
| Backup | | | Backup is the media (e.g. tapes, CDs, diskettes, etc.) and devices used for secondary storage of the organization's programs and data. |
| | Backup Media | Physical Location, Backup Media Type (e.g. Tape, Diskette, SD Card, etc.) | Tapes, CDs/DVDs, SD Cards, Floppy Disks, or similar easily transportable means of providing secondary storage of the organization's programs and data. |
| | Portable Storage Device (e.g. USB Key, USB Drive, etc.) | Portable Storage Type (e.g. USB Key, External USB Drive, etc.) | A portable data storage device that sends and receives data through a computer's Universal Serial Bus (USB) port. |
| End User Devices | | | End-user devices are employed by users to access or create and organization's data or to output this data in an electronic or printed form. |
| | Desktop | Physical Location, Operating System, Vendor-Supplied Device, Application Specific, Device Ownership | A personal computer that is designed to stay in a single location. This includes tower units and all-in-one machines, like an iMacs ®. Unlike laptops and other portable devices, desktop computers are not powered from an internal battery, and therefore, must always remain connected to a wall outlet for power. |
| | Desktop or Laptop | Physical Location, Operating System, Vendor-Supplied Device, Device Mobility, Application Specific | The use of both desktop and laptop computers interchangeably to access an organization's programs or data. If both desktop and laptop computers are used to access a program or data, but one or more laptops are occasionally removed from the organization's premises, then select the Desktop and Laptop media types separately, as the risk to laptops will likely be different than those faced by desktops. |
| | Digital Camera | Device Mobility (e.g. Fixed, Relocatable Internally, etc.) | A camera that records and stores digital images. |
| | Diskless Workstation | Physical Location | Diskless workstations are computers that do not store data persistently, as this function is performed by a server or other centralized storage. These may include computers that boot from a server, computers that boot locally from ROM or a disk that does not store data, or are terminals for a centralized computing system (e.g. "mainframe" |

TABLE 1-continued

Component Categories, Components, Component Properties, and Descriptions.

| Component Categories (33) | Components (35) | Component Properties (40) | Descriptions |
|---|---|---|---|
| | Laptop | Physical Location, Operating System, Vendor-Supplied Device, Device Mobility, Application Specific, Device Ownership | or "mid-range" computer). A portable personal computer which integrates the monitor, keyboard, mouse, and CPU into a single unit. Laptops include a battery to provide power when a wall outlet is not readily available. This media category also includes computers known as notebooks (e.g. Chromebook ®, Microsoft Surface ® etc.). |
| | Pager | None | A small telecommunications device that receives (and, in some cases, transmits) alert signals and/or short messages. |
| | Scanners, Printers, Copiers, or Facsimile Machines | Physical Location, Leased or Owned, PIN Retrieval, Autowipe Capability, FAX Capability | A scanner is a device that scans documents and converts them into digital data. A printer is a device that accepts text and graphic output from a computer and transfers the information to paper, usually to standard size sheets of paper. A copier is a machine that makes copies of printed, digital, or graphic matter. This category also includes facsimile machines which provide the telephonic transmission of scanned printed material to a telephone number connected to an output device. |
| | Smartphone | Mobile Device OS, Device Mobility, Device Ownership | A cellular phone that performs many of the functions of a computer, typically having a touchscreen interface, Internet access, and an operating system capable of running downloaded applications. |
| | Tablet | Mobile Device OS, Device Mobility, Application Specific, Device Ownership, Vendor-Supplied Device | A portable computer that integrates a monitor screen and a CPU, but usually utilizes a user's finger gestures or a stylus for input, rather than a physical keyboard or mouse. Like laptops, tablets also include a built-in battery for power. They are larger than smartphones, with screens that are at least 7", measured diagonally, and may or may not be capable of connecting to cellular networks. |
| Infrastructure | | | An organization's Infrastructure provides centralized information system processing, storage, and communications services. |

TABLE 1-continued

Component Categories, Components, Component Properties, and Descriptions.

| Component Categories (33) | Components (35) | Component Properties (40) | Descriptions |
|---|---|---|---|
| | Audio Recording System | Physical Location, Leased or Owned | A device used to make and store voice recordings. It may be part of or separate from an organization's phone system, and would include voice recording systems used by customer service or help desk staff to record voice conversations for quality improvement and/or legal purposes. |
| | External Disk Storage | Physical Location, Component Importance | A physical or virtual device used to store programs or data for use by other devices. These devices can be managed independently of the devices for which they are storing programs or data. |
| | Server | Physical Location, Component Importance, Physical or Virtual, Operating System, Internet Facing, Vendor-Supplied Device, Application Environment | A physical or virtual device (i.e. Virtual Machine or VM) used to host programs or data for use by other devices, referred to as clients, or for other programs. |
| | Network Device | Physical Location, Internet Facing | Network devices transmit, receive, route, and protect an organization's internal and external network traffic. |
| | Platform-as-a-Service | Jurisdiction (e.g. US, non-US, World) | A third-party service that provides an organization with the infrastructure necessary to develop, run, and manage the organization's custom, Internet-accessible applications, thereby eliminating the need for an organization to maintain a physical infrastructure of its own to do so. |
| | Video Recording System | Physical Location | A device used to make and store video recordings. When these contain the "likeness" of a patient entering a medical facility, this video record is considered electronic protected health information ("ePHI") and must be safeguarded accordingly. |
| Management | | | Management entails the assessment, organization, and administration of the organization's Information System Security controls and operations. |
| | Security & Governance | None | Information about the establishment and maintenance of an organization's Information Systems security activities and its |

TABLE 1-continued

Component Categories, Components, Component Properties, and Descriptions.

| Component Categories (33) | Components (35) | Component Properties (40) | Descriptions |
|---|---|---|---|
| Medical Devices | | | oversight by the organization's senior management. |
| | | | Any device or healthcare product intended for use in the diagnosis of disease or other condition, or for use in the care, treatment or prevention of disease, which does not achieve any of its primary intended purposes by chemical action or by being metabolized. |
| | Fixed Treatment & Diagnostic Device | Physical Location, Operating System, Authentication Type | Devices that provide medical treatment, disease diagnosis, or physical imaging from a fixed location. Examples include radiation therapy systems, like cyber-knives, and magnetic resonance imaging (MRI) or computer-aided tomography (CAT) devices. |
| | Mobile Treatment & Diagnostic Device | Operating System, Device Mobility, Authentication Type | Devices that provide medical treatment, disease diagnosis, or physical imaging that are portable enough to be moved to different locations. Examples include electrocardiogram (EKG), ultrasound, and portable X-ray devices. |
| | Laboratory | | Any clinical device used to analyze bodily fluid samples, like blood, urine, and sputum, collected to help diagnose a disease or medical condition. |
| | Medication & Supply Management | Physical Location | Medication and supply management devices allow medications and medical supplies to be stored near the point of care, while controlling and tracking their distribution. |
| | Pharmacy Automation | | Pharmacy automation devices provide automated handling and dispensing of medications. |
| | Telemetry Device | Device Mobility | Devices that make clinically relevant measurements of a patient's condition or location and relay the results to a central station for interpretation. Examples include ICU monitors and infant protection systems. |
| Networks | | | A group of computer systems and other computing hardware devices that are linked together through communication channels to facilitate |

TABLE 1-continued

Component Categories, Components, Component Properties, and Descriptions.

| Component Categories (33) | Components (35) | Component Properties (40) | Descriptions |
|---|---|---|---|
| | | | communication and resource-sharing among a wide range of users. |
| | Internal Wired Network | None | A communications channel that uses the organization's network hardware and cabling. |
| | Internal Wireless Network | None | A communications channel that uses the organization's radio-based network hardware. |
| | External Network | External Network Type (e.g. Leased Line, Wi-Fi, Public Internet, etc.) | A communications channel managed by an external party or vendor. |
| People | | | Individuals employed by, contractually engaged by, or otherwise associated with an organization who may use or view its systems and data. |
| | Internal User Type | Internal User Type (e.g. Employee, Provider, Student, etc.) | Individuals who are employed by or otherwise associated with (e.g. students, providers, volunteers, etc.) an organization who may use or view its systems and data. |
| | External User Type | External User Type (e.g. Contractor, Consultant, Vendor, etc.) | Individuals or companies engaged by the organization contractually to provide certain goods or services who may use or view its systems and data. |
| Software | | | Programs that instruct a computer what to do or store, manage, and retrieve information. |
| | Application | Application Type, Authentication Type, Data Type | An application is a self-contained program that performs a specific function. Most applications include or access an integrated database to store the application's data. Examples include: Electronic Medical Record, Picture Archiving and Communication System, Patient Billing System, etc. |
| | Database | Data Type (payment card industry ("PCI"), ePHI, etc.) | A stand-alone data store not associated with a specific application used to maintain organizational data. This includes data marts and data warehouses. |
| | File Share | Data Type (PCI, ePHI, etc.) | A shared space on a network accessible drive used for storing files accessible by one or more individuals. |
| | Interface-Interchange | Data Type (PCI, ePHI, etc.) | A program used to transfer data from a device, database, or file share to another device, database, or file share. An interface/interchange acts as a data conduit and does not normally store |

TABLE 1-continued

Component Categories, Components, Component Properties, and Descriptions.

| Component Categories (33) | Components (35) | Component Properties (40) | Descriptions |
|---|---|---|---|
| | | | data, unless it cannot deliver it to the receiving device, database, or file share. |
| | Script | | A program used to invoke and/or control other programs. |
| | Software-as-a-Service | Accessibility (e.g. Internal Only, Anywhere), Authentication Type | An application program licensed on a subscription basis and centrally hosted on a third-party's infrastructure. Most Software-as-a-Service programs are accessed via a web browser using an Internet connection. These programs may also be referred to as "cloud-based" applications. |

As shown in FIGS. 3A-3C and 4A-4C and discussed in more detail below, the risk analysis method and system 5 provides the user with components 35 and the user selects the components 35 that are applicable to the asset being analyzed (see user interface illustrated at FIG. 5). In some embodiments, the components 35 that are provided to the user include the components listed in Table 1. After receiving a selection of components 38 from a user, the risk analysis method and system 5 provides the user with the component properties 40 which have been assigned to each selected component in the database 22. For example, in some embodiments the database 22 includes the data illustrated in Table 1; if a user selects "backup media," then the component properties for "backup media" (as shown in Table 1) consist of "Physical Location" and "Backup Media Type." According to multiple embodiments and alternatives, a specific set of component properties 40 are assigned to each component 35.

After the user chooses the selection of components 38 that are applicable to the asset, the risk analysis system and method 5 then provides the user with the property values 42 that have been assigned to each component property 40 by retrieving this data from database 22. For example, after the user selects "backup media type," possible property values 42 for "backup media type" include CD/DVD, diskette, removable hard drive, SD Card/Micro SD Card, tape, and other. Once the property values 42 have been provided via the user interface 12, the user then selects the property value(s) 42 that is applicable. For example, the user can choose from CD/DVD, diskette, removable hard drive, SD Card/Micro SD Card, tape, and other to describe the "backup media type" that was previously selected.

According to multiple embodiments and alternatives, Table 2 illustrates property values 42 that have been assigned to component properties 40 (as shown by the property value 42 that is in the same row as the component property 40). Table 2 also provides descriptions of the component properties 40 which can be provided to the user to aid in the risk analysis process. One of ordinary skill in the art will appreciate that a variety of property values 42 may be assigned to the component properties 40, and a variety of descriptions may be provided to the user.

TABLE 2

Component Properties, Component Property Descriptions, and Property Values

| Component Properties (40) | Component Property Descriptions | Property Values (42) |
|---|---|---|
| Accessibility | Defines whether or not a web-based application can be accessed only from inside the organization or from anywhere a user has Internet access. | Internal Access Only, Anywhere |
| Application Environment | Describes what environment an infrastructure device supports. | Production, Stage, Quality Assurance/Testing, Development, Training, Reporting, Other, Don't Know |
| Application Specific | Defines whether or not an end-user or infrastructure device are dedicated to support a single application. | Yes or No |
| Application Type | Indicates whether a software component was purchased from a vendor (i.e. Off-the-Shelf), was custom developed, or has both Off-the-Shelf and custom elements. | Custom, OTS, Both |

TABLE 2-continued

Component Properties, Component Property Descriptions, and Property Values

| Component Properties (40) | Component Property Descriptions | Property Values (42) |
| --- | --- | --- |
| Authentication Type | Describes whether or not a user must log in to be able to access a system resource, and if so, how that log in is accomplished. | Internal, AD Integrated, Single Sign On, None, Generic, Biometric, Swipe/RFID Card, Don't Know |
| Backup Media Type | Defines the specific media type being used for backups, as these are generally stored and handled differently. | CD/DVD, Diskette, Removable Hard Drive, SD Card/Micro SD Card, Tape, Other |
| Data Type | Defines the type of data being processed and stored by various software components. | Payment Card Access, Personally Identifiable Information, Personal Healthcare Information, Internal Use Only, Other |
| Device Mobility | Indicates whether a mobile-capable device is actually being moved, and if so, if it is only moved within a certain facility or if can be removed from the facility and taken anywhere. | Fixed, Internally Relocatable, Relocatable Anywhere |
| Device Ownership | Distinguishes between organization-issued devices and personally owned devices. | Organization, User |
| External FAX Capability | For Multi-function Printers, indicates if they have been configured to send faxes to external parties. | Yes or No |
| External Network Type | Further defines external network types, as each type may present its own set of risks. | Leased Line, Public Internet, Organizational VPN, Vendor VPN, Wi-Fi, Microwave |
| External User Type | Further defines external user types, as each type may present its own set of risks. | Consultant, Contractor, Vendor |
| Importance | Indicates how important a device is in functionally supporting a specific system. For example, a Production server is generally going to be much more important in supporting a specific application than a test server. | 1 (low) to 5 (high) |
| Internal User Type | Further defines internal user types, as each type may present its own set of risks. | Employee, Provider, Student, Volunteer |
| Internet Facing | For server and network device, indicates whether or not they are accessible from the Internet, which subjects them to greater risk. | Yes or No |
| Jurisdiction | For the Platform-as-a-Service component (e.g. MS Azure ®, Amazon Web Services ®, etc.), defines where the data stored by support this platform are physically located. | US, Non-US, World |
| Leased or Owned | For Scanners, Printers, Copiers, or Facsimile Machines, describes whether or not the device is owned, and therefore maintained by the organization, or leased, and therefore maintained by the vendor. | Leased, Owned |
| Physical Location | For all physical components, defines where these devices are normally housed. | User-defined |
| Mobile Device Operating System | For smartphones, tablets, and Chromebooks ®, defines what operating system is in use in the device. | Android ®, Apple ®, Microsoft Windows ® Mobile, Other |
| Operating System | For end-user workstations and servers, defines what type of operating system is in use in the device. | Supported Windows ®, Unsupported Windows ®, Supported Apple Mac OS ®, Unsupported Apple Mac ® OS, Linux ®, AIX/UNIX/INFORMIX, Other |
| Physical or Virtual | Indicates whether or not a server is a physical or virtual machine, since | Physical, Virtual |

TABLE 2-continued

Component Properties, Component Property Descriptions, and Property Values

| Component Properties (40) | Component Property Descriptions | Property Values (42) |
|---|---|---|
| | restoring a physical server could take more time than restoring a virtual server. | |
| Portable Storage Type | Further defines portable storage types, as each type may present its own set of risks. | USB Key, External USB Drive |
| Vendor-Supplied Device | Indicates whether or not an end-user or infrastructure device was furnished by the vendor, which sometimes happens with certain systems. | Yes or No |

Figure 3A:
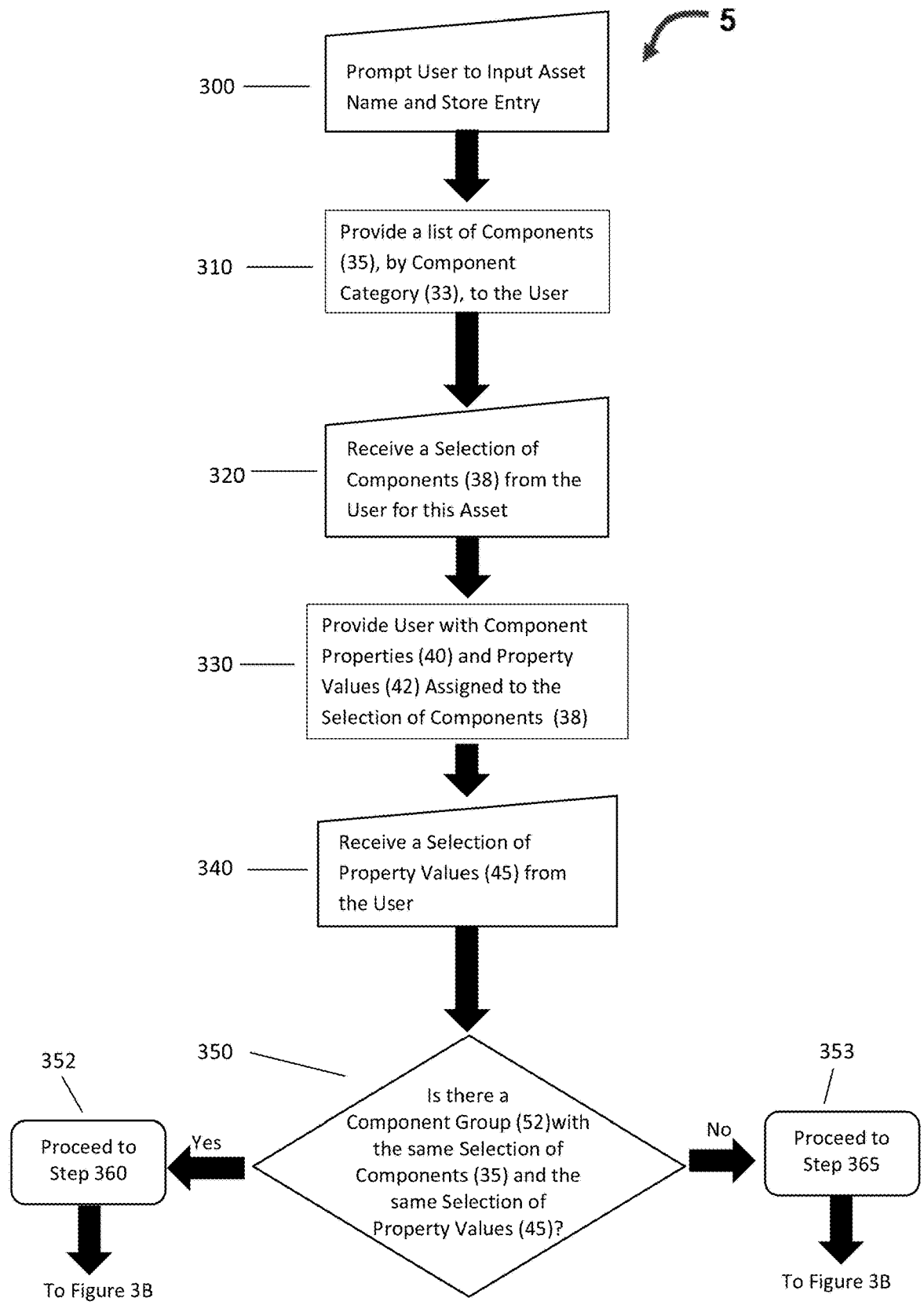
FIG. 3A-3C is a flow chart illustrating the risk analysis method and system, according to multiple embodiments and alternatives.
Figure 3B:
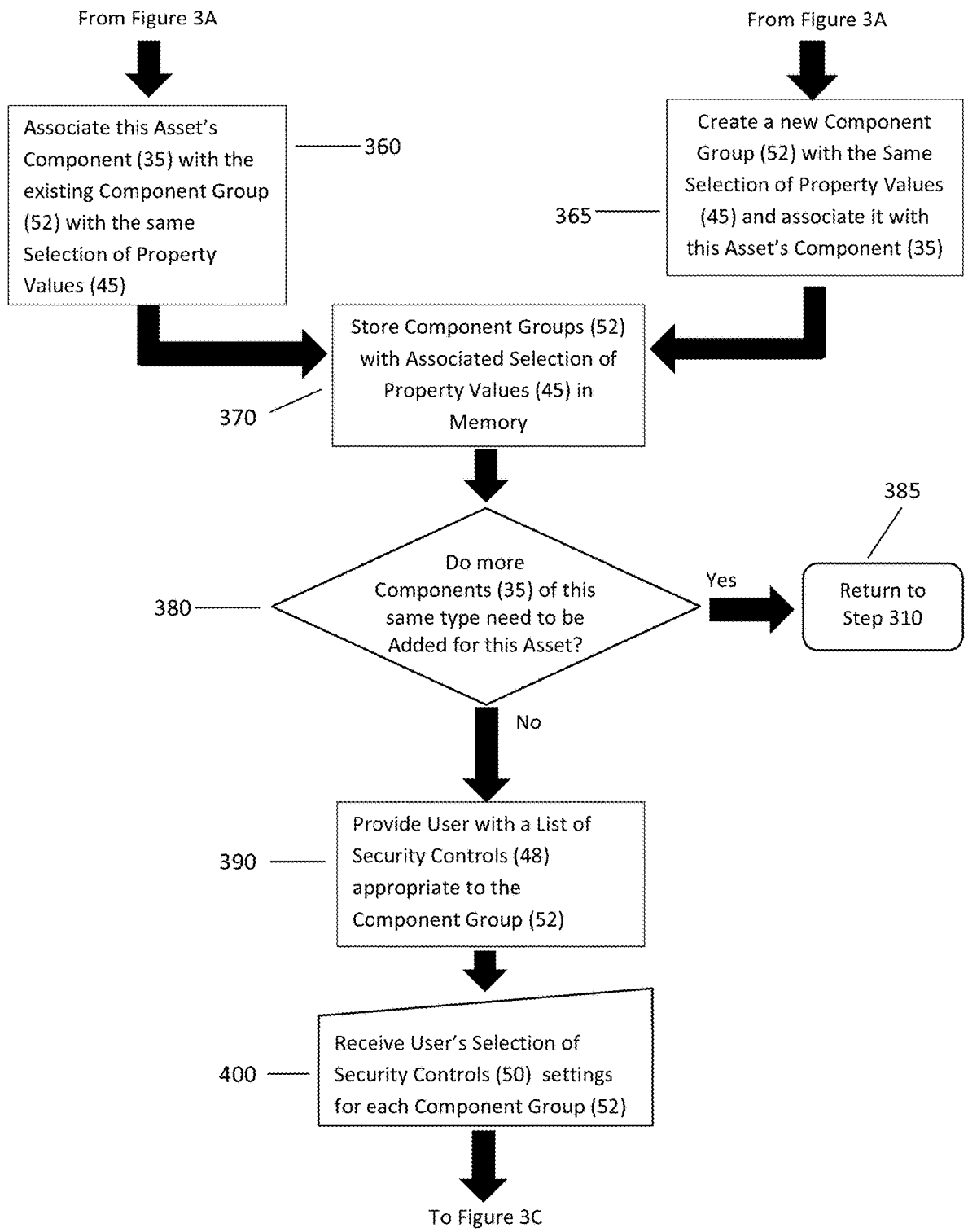
Figure 3C:
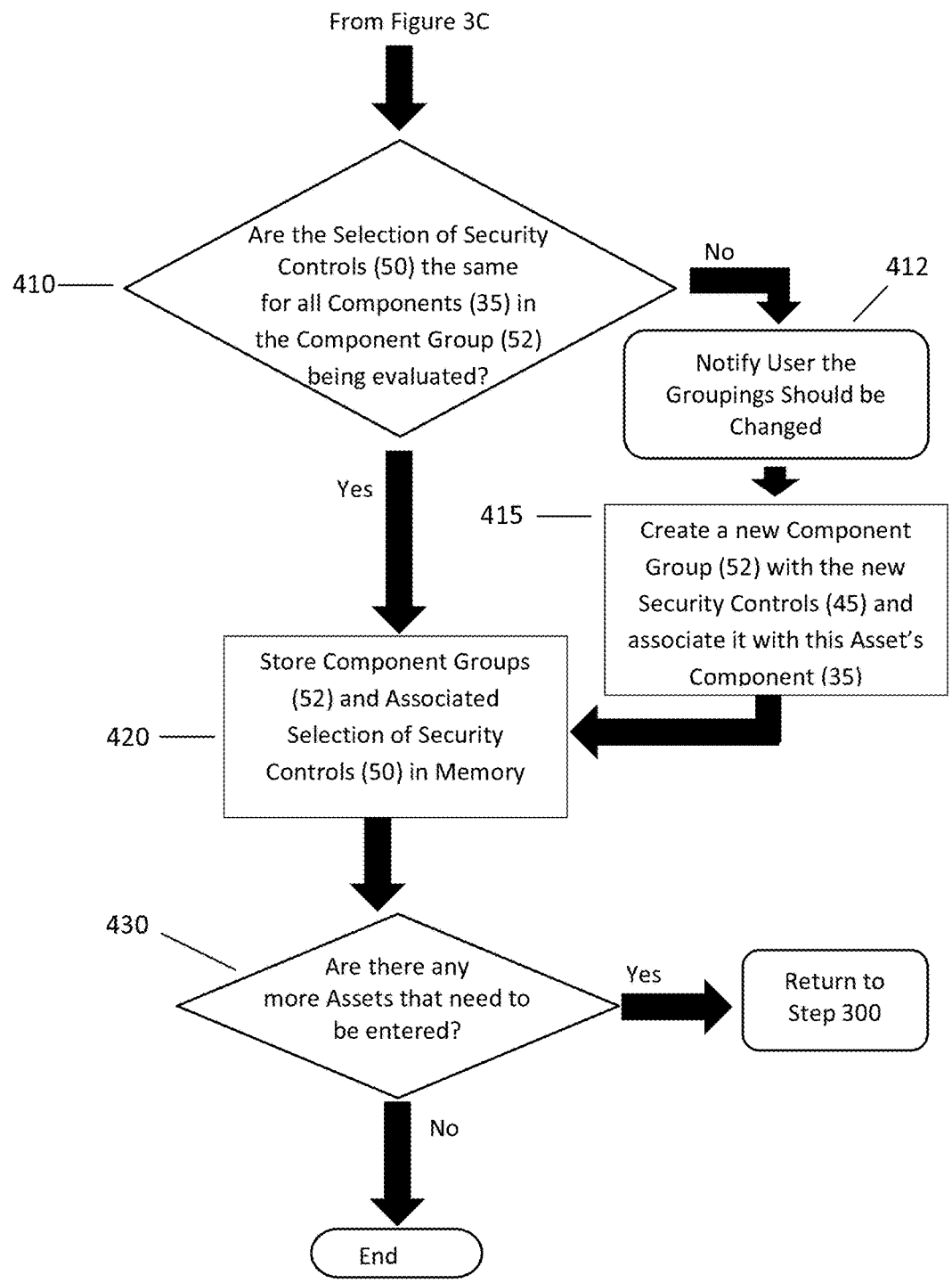
Figure 4A:
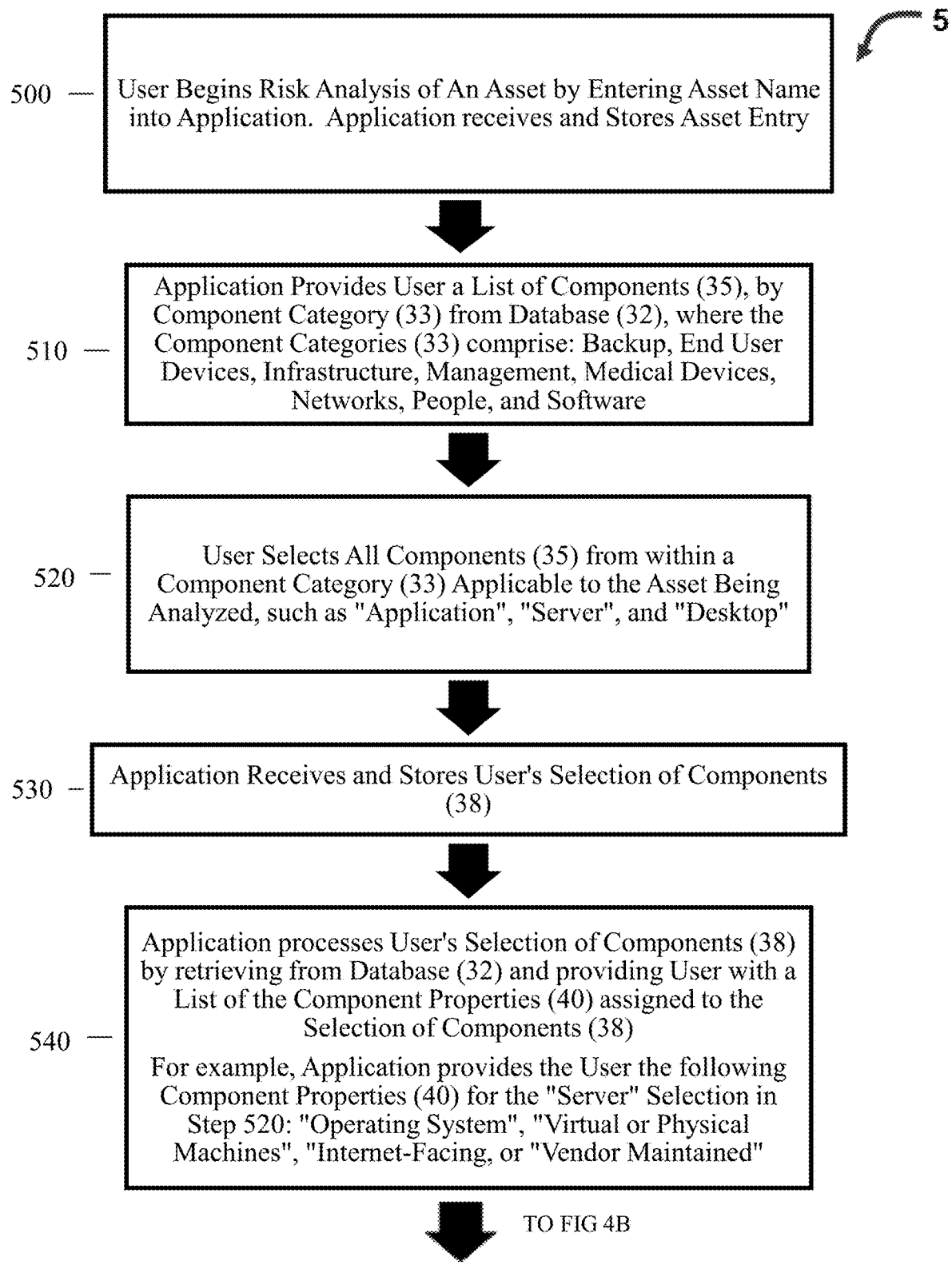
FIG. 4A-4C is a flow chart illustrating the risk analysis method and system, according to multiple embodiments and alternatives.
Figure 4B:
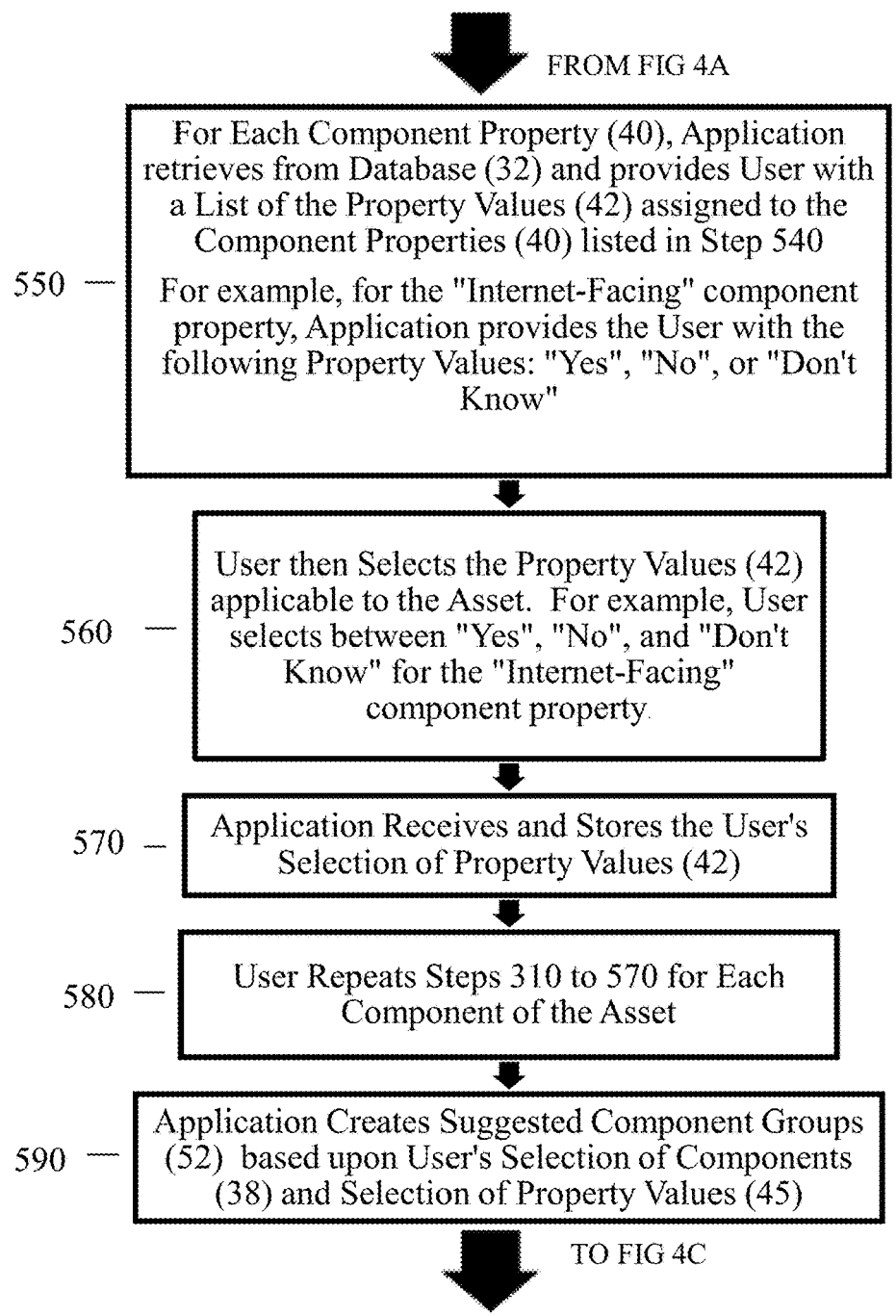
Figure 4C:
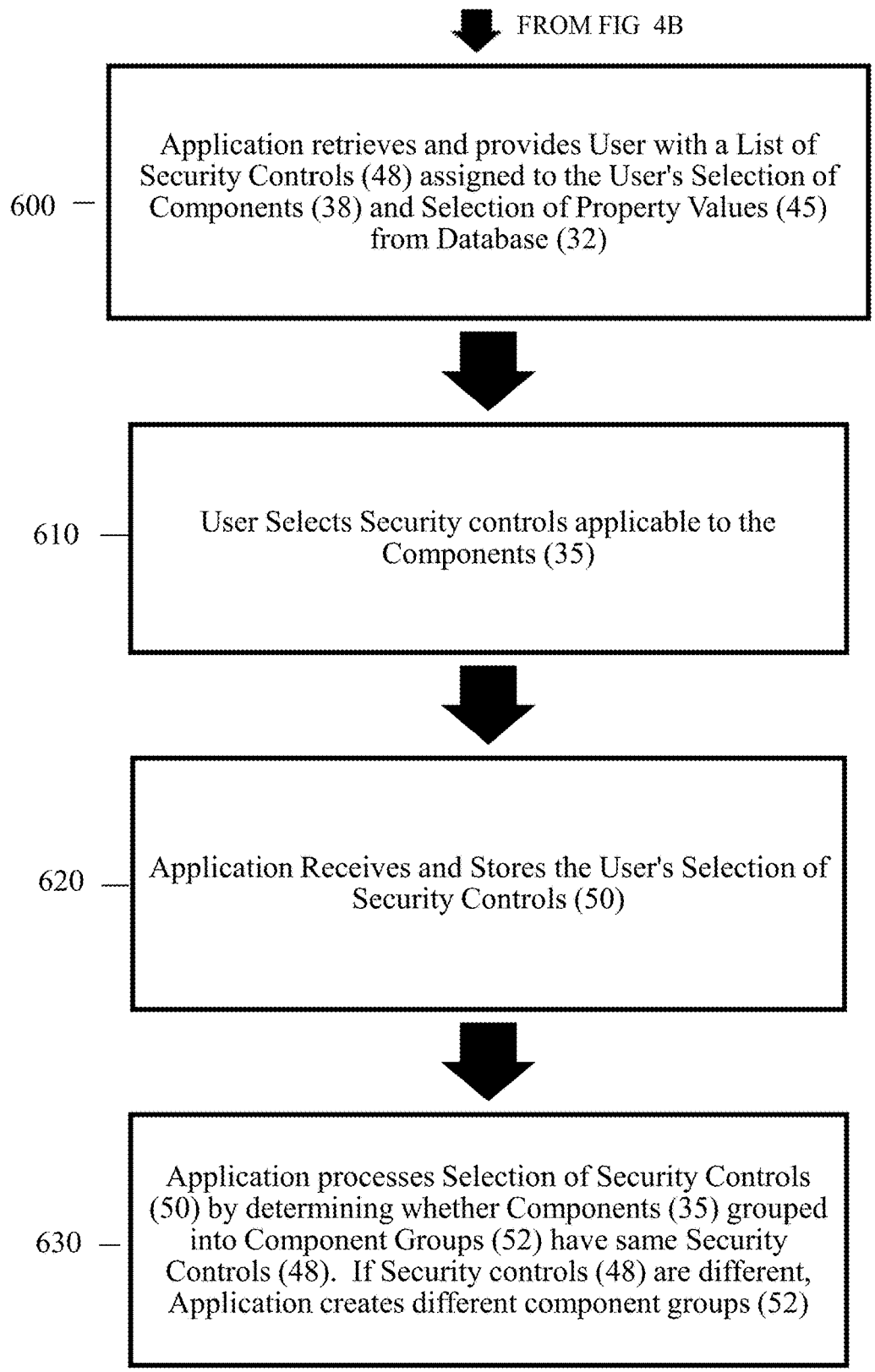

FIG. 3A-3C depicts a flow diagram of application 11 implementing the risk analysis method and system 5 to create component groups 52, according to multiple embodiments and alternatives. FIG. 4A-4C depicts a more detailed flow diagram of application 11 implementing the risk analysis method and system 5 wherein a user selects particular components 35, component properties 40, and sets property values 42, and security controls 48. FIGS. 5-8 illustrate various user interface displays of the application 11 accessed by a user device 30 via an internet connection (as a non-limiting example). The various user interface displays illustrate some of the steps in the risk analysis method and system utilizing application 11, according to multiple embodiments and alternatives. It will be appreciated that the scope of embodiments is not limited to and does not otherwise require the steps illustrated in FIGS. 3A-3C and 4A-4C, and is not limited to the user interface displays illustrated in FIGS. 5-8.

Figure 6A:
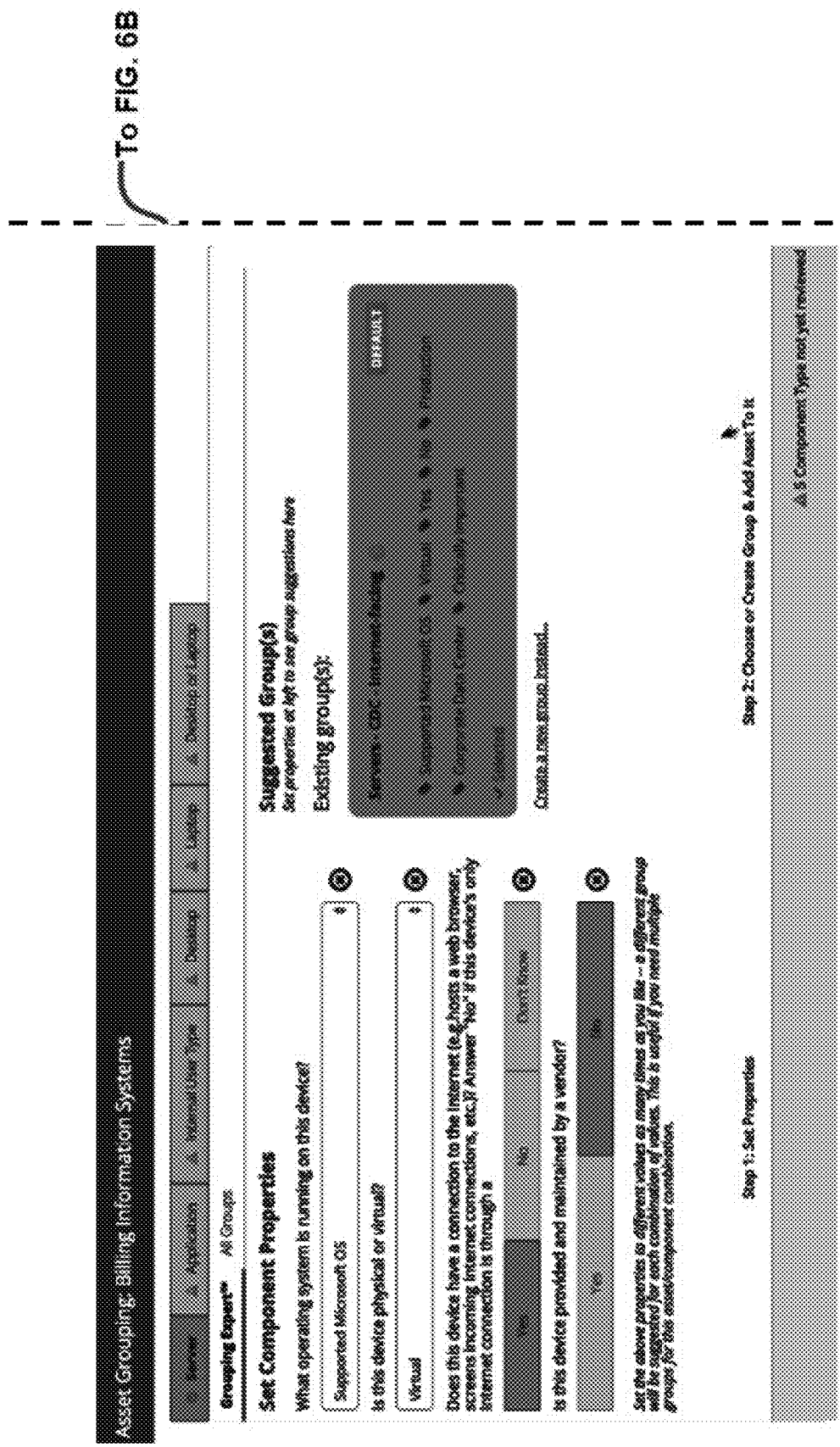
FIG. 6A-6B shows a portion of one user interface display of the risk analysis method and system, according to multiple embodiments and alternatives.
Figure 6B:
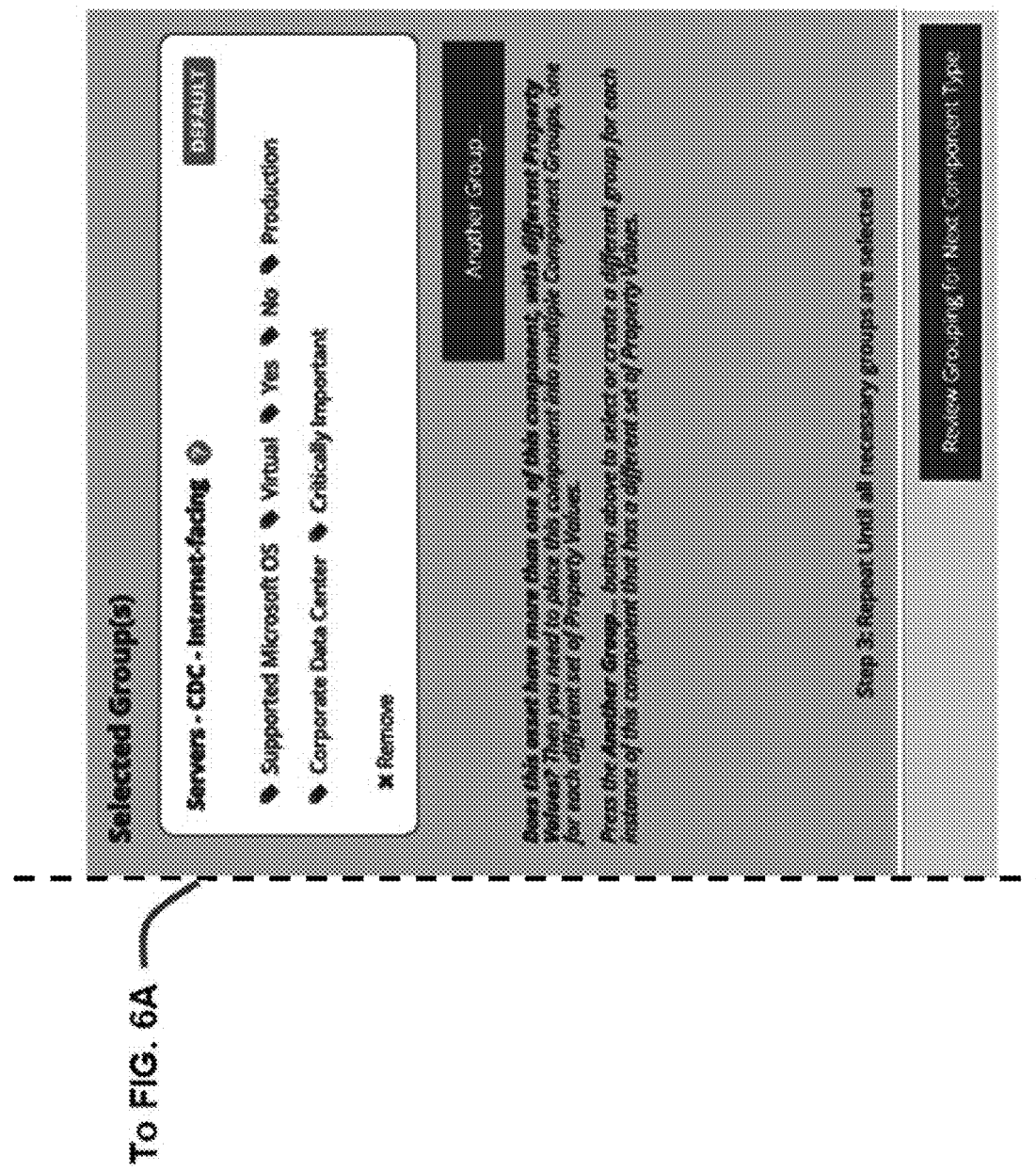

As shown in FIG. 3A-3C, after a user is able to access the application 11, the risk analysis system and method 5 prompts a user to input the asset name (such as "Billing System") and the entry is stored (300). At step 310, a list of components 35, grouped by component categories 33 are provided to the user (see user interface illustrated at FIG. 5 which shows some of the component categories and components from Table 1). In some embodiments, the user can select the components by checking the boxes for each applicable component 35 (see FIG. 5). After the user selects the components 35 that are applicable to the asset being analyzed, application 11 receives and stores the selection of components 38 from the user (320). Next, at step 330 application 11 provides the user with a list of component properties 40 and a list of property values 42 assigned to the selection of components 38 (see FIG. 6A-6B. FIGS. 6A and 6B appear on two drawing sheets but consist of one illustrated user interface). In some embodiments, application 11 includes database 22, which includes the data provided in Tables 1 and 2. When a user creates a selection of components 38, application 11 generates the assigned component properties 40 and property values 42 by pulling the data from database 22. At step 330, the user selects the property values 42 that are applicable to the component being analyzed (see the drop-down menus and virtual buttons displayed in FIG. 6A-6B). Next, the application receives a selection of property values 45 from the user and stores them (340).

At step 350, the application 11 determines if there is a component group 52 with the same selection of components 38 and the same selection of property values 45. If there is (352), the application 11 proceeds to assign the component for this asset to the existing component group 52 (360). If not (353), the application 11 creates a new component group 52 and assigns the asset for this component to the new component group 52 (365). The application then stores these component groups 52 in memory (370). If additional components 38 of the same type need to be created (380), the application returns the user to step 310 for the selection (385). If additional components 38 do not need to be created, the application proceeds to step 390.

At step 390, the application 11 provides the user with a list of security controls 48 (see FIG. 7) by retrieving the data from database 22 (see FIG. 2). Some of the most common security controls (that are provided herein for non-limiting purposes) include anti-malware software, data backup, encryption of disks (full disk, file based, etc.), operating system patching, and surge protectors. "Anti-malware software" is a program or set of programs that are designed to prevent, search for, detect, and remove software viruses, and other malicious software like worms, trojans, adware, and more. The control "data backup" is the result of copying or archiving files and folders (on-site or off-site) for the purpose of being able to restore them in case of data loss or emergency. "Encryption of disks" refers to technology which protects information by converting it into unreadable code that cannot be easily deciphered by unauthorized people. This security control is intended to prevent unauthorized drive and data access. Moreover, an authentication key can be used to reverse convert and render the data readable, and disk encryption (i.e. full disk, file based, etc.) may be used on desktops, laptops, and any other computer equipment that contains a file system or data store. The control "operating system patching" refers to periodically applying patches and/or upgrading operating system software and related device drivers. The control "surge protector" refers to an appliance designed to protect electrical devices from voltage spikes by limiting the voltage supplied to an electrical device by blocking or shorting to ground any unwanted voltages. One of ordinary skill in the art will appreciate that a variety of security controls 48 may be utilized and assigned to any number of components 38, and that any number of security controls 48 may be stored in database 22.

Figure 8:
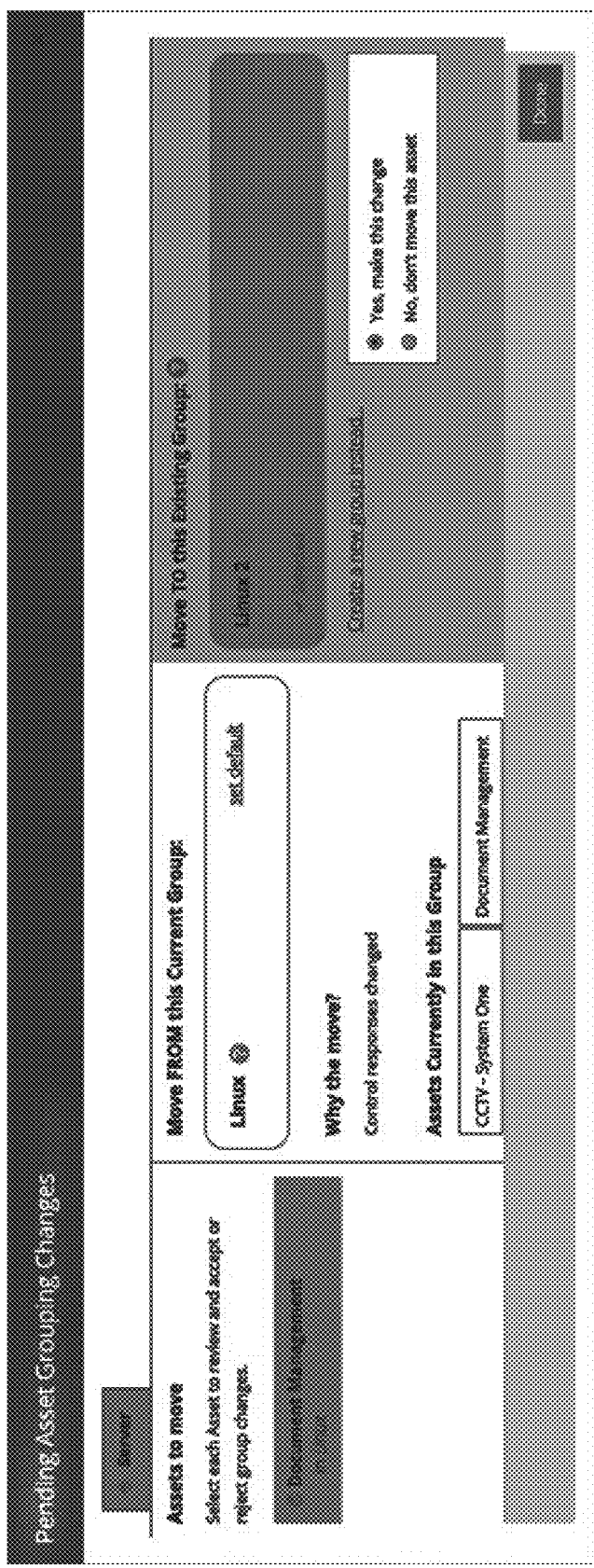
FIG. 8 is shows a portion of the user interface display of the risk analysis method and system, according to multiple embodiments and alternatives.

At step 400, application 11 receives the user's selection of security controls 50 (for each component group 52) and stores the data. Next, application 11 determines whether the selection of security controls 50 are identical for all components 35 in the component group 52 being analyzed (410). For example, the user interface shown in FIG. 7 displays certain component groups 52 (i.e. Server/Linux) and prompts the user to select whether certain security controls 48 are being implemented (i.e. CCTV—System One, Document Management). If the user's selection of security controls 50 indicate that different security controls 48 are being implemented for different components 35 that have been placed in the same component group 52, application 11 will notify the user that the groupings should be changed (412) (see "Pending Group Changes" virtual button in FIG. 7). If a user selects the "Pending Group Changes" virtual button, the user will be prompted to the "Pending Asset Grouping Changes" user interface shown at FIG. 8. In FIG. 8, application 11 informs the user about the components 35 that should be moved (see "Assets to Move"), informs the user why application 11 suggests the move, informs the user about the assets staying in the particular component group 52, and prompts the user to approve or deny the suggested changes. The user can then review the grouping for the next component group 52.

If the selection of security controls 50 are identical, application 11 stores the component group 52 and the associated selection of security controls 50 in memory (420). If the attributes are not identical, application 11 creates new component groups 52 consisting of a selection of components 38 with identical selection of property values 45 and identical selection of security controls 50 (415). At step 420, the application stores the component groups 52 and associated selection of security controls 50 in memory. If the user needs to add more assets, the application 11 returns the user to step 300 to input the next asset name.

FIG. 4A-4C depicts a more detailed flow diagram of application 11 implementing the risk analysis method and system 5. At step 500, a user begins the risk analysis by entering an asset name (e.g. "server") into application 11. Application 11 then receives and stores the asset entry (500). Utilizing database 22, at step 510 application 11 provides a user with a list of components 35, grouped by component categories 33. In some embodiments, the component categories 33 comprise backup, end user devices, infrastructure, management, medical devices, networks, people, and software. The user then selects all the components 35 from within a component category 33 that are applicable to the asset being analyzed (520), such as "application," "server" and "desktop." In some embodiments, the application provides the user with the components 35 that are listed in Table 1 and some of which are shown in FIG. 5 (i.e. audio recording system, disk array, etc.). In the particular example shown in FIG. 4A-4C, the user selects the component "Server" (see also the virtual "check button box" next to "server" in FIG. 5). Next, application 11 receives and stores the user's selection of components 38 (530). At step 540, application 11 processes user's selection of components 38 by using database 22 to provide the user with a list of the component properties 40 assigned to the selection of components 38 (see FIG. 6A-6B). For example, in Table 1 the component properties 40 assigned to "server" include operating system, virtual or physical machines, internet-facing, and physical location. If the data from Table 1 is stored in database 22, and application 11 provides these assigned component properties 40 to the user for the "server" selection. Next, at step 550, application 11 provides the user with a list of property values 42 assigned to component properties 40 in the same manner as step 540 by utilizing database 22. For example, for the "Internet-Facing" component property, application 11 provides the user with the following property values: "yes", "no", or "don't know" (see virtual buttons displayed in FIG. 6A-6B).

The user then selects the property values 42 that are applicable to the asset (560). For example, the user selects between "yes", "no", or "don't know" for the "Internet-Facing" component property 40 of the selected component "server" (see FIG. 6A-6B). Application 11 then receives and stores the user's selection of property values 42 (570). At step 580, the user repeats steps 310 to 570 for each component 35 of the asset. At the conclusion of step 580, the asset's various components 35 will be assigned a selection of components 38 and a selection of property values 42, and application 11 then creates suggested component groups 52 at step 590.

Figure 7:
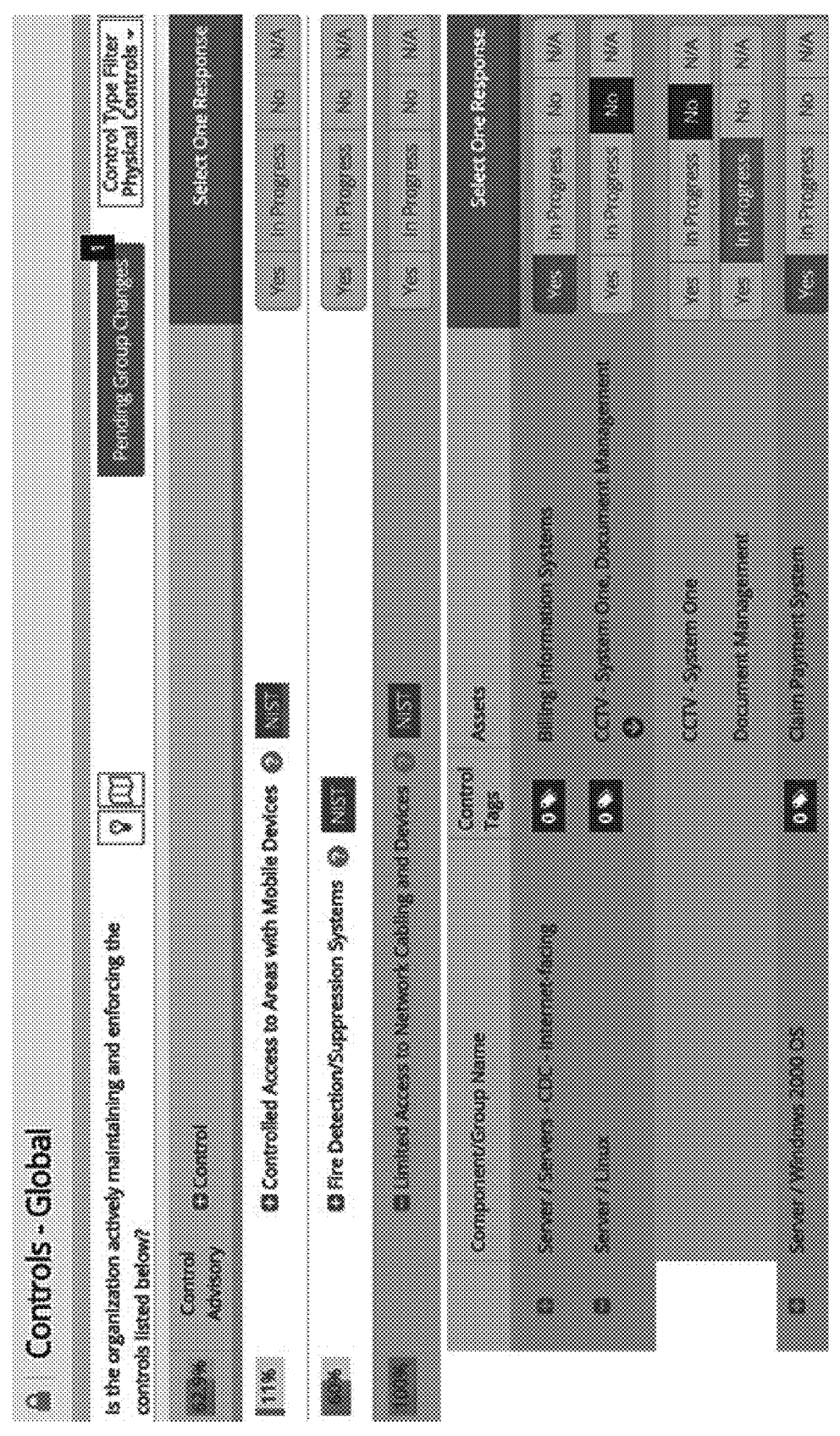

Utilizing database 22, at step 600 application 11 retrieves and provides the user with a list of security controls 48 that have been assigned to the user's selection of components 38 and selection of property values 45 (see FIG. 7). The user then selects the security controls applicable to the components 35 (610) and application 11 receives and stores the user's selection of security controls 50 (620). At step 630, application 11 processes the selection of security controls 50 by determining whether components 35 that have been grouped into component groups 52 have the identical security controls 48. If security controls 48 are different, application 11 creates different component groups 52 comprising components 35 with identical threats and vulnerabilities (i.e. identical selection of components 38, identical selection of property values 45, and identical selection of security controls 50) (see FIG. 8).

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways.

Also, it is to be understood that words and phrases used herein are for the purpose of description and should not be regarded as limiting. The use herein of "including," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:
1. A method for analyzing risks of an asset, the method comprising the steps of:
 (a) providing a list of components to a user via a user interface;
 (b) receiving a selection of the components from the user via the user interface;
 (c) providing a list of component properties and a list of property values to the user via the user interface, wherein each of the component properties and the property values correspond to the selection of the components;
 (d) receiving a selection of the property values from the user via the user interface;
 (e) providing a list of security controls to the user via the user interface corresponding to the selection of the components;

(f) receiving a selection of the security controls from the user via the user interface;

(g) generating at least one component group by assembling the components comprising the selection of the components, the selection of the property values, and the selection of the security controls, wherein each of the selection of components, the selection of the property values, and the selection of the security controls are the same within the at least one component group, (h) generating a risk profile for more than one asset by repeating steps "a"-"g" for each more than one asset; and (i) monitoring changes by the user to the selection of the components, the selection of the property values, and the selection of the security controls and generating additional component groups, wherein each of the selection of components, the selection of the property values, and the selection of the security controls are the same within each of the additional component groups.

2. The method of claim 1, further comprising the step of providing the component group generated in step "g" to the user via the user interface.

3. The method of claim 1, further comprising, after performing step "g" performing the step of receiving modifications to the component groups in response to user input via the user interface and generating additional component groups.

4. The method of claim 1, further comprising the step of providing component categories to a user via a user interface before performing step "a", wherein the component categories are chosen from the group consisting of backup, end user devices, infrastructure, management, medical devices, networks, people, and software.

5. The method of claim 1, wherein the components are chosen from the group consisting of backup media, portable storage device, desktop, laptop, digital camera, diskless workstation, pager, scanners, printers, copiers, facsimile machines, smartphone, tablet, audio recording system, external disk storage, server, network device, platform-as-service, video recording system, security and governance, fixed treatment and diagnostic device, mobile treatment and diagnostic device, laboratory, medication and supply management, pharmacy automation, telemetry device, internal wired network, internal wireless network, external network, internal user type, external user type, application, database, the share, interface interchange, script, and software-as-a-service.

6. A computer implemented method of analyzing a cybersecurity risk of an asset, the method comprising the steps of:

(a) generating a database comprising components, component properties, property values, and security controls, said generating step further comprising assigning the component properties to the components, assigning the property values to the component properties, and assigning the security controls to the components;

(b) providing a list of the components to a user via a user interface by retrieving the components from the database;

(c) receiving a selection of the components from the user via the user interface and storing the selection of the components;

(d) providing a list of the component properties and a list of the property values to the user via the user interface by retrieving the component properties and the property values assigned to the selection of the components from the database;

(e) receiving a selection of the property values from the user via the user interface and storing the selection of the property values;

(f) providing a list of the security controls to the user via the user interface by retrieving the security controls assigned to the selection of the components from the database;

(g) receiving a selection of the security controls from the user via the user interface and storing the selection of the controls;

(h) generating at least one component group by assembling the components comprising the selection of the components, the selection of the property values, and the selection of the controls, wherein each of the selection of components, the selection of the property values, and the selection of the security controls are the same within the at least one component group;

(i) generating a risk profile for more than one asset by repeating steps "a"-"g" for each more than one asset; and (j) monitoring changes by the user to the selection of the components, the selection of the property values, and the selection of the security controls and generating additional component groups, wherein each of the selection of components, the selection of the property values, and the selection of the security controls are the same within each of the additional component groups.

7. The method of claim 6, further comprising, after performing step "h", performing the step of receiving modifications to the component groups in response to user input via the user interface and generating additional component groups.

8. The method of claim 6, further comprising the step of providing component categories to a user via a user interface before performing step "a" and assigning the components to the component categories, wherein the component categories are chosen from the group consisting of backup, end user devices, infrastructure, management, medical devices, networks, people, and software.

9. One or more non-transitory computer-readable media storing instructions, which, when executed by at least one processor, instruct the at least one processor to perform actions comprising:

(a) storing a database comprising components, component properties, property values, and controls, wherein the database includes component properties assigned to the components, property values assigned to the component properties, and security controls assigned to the components;

(b) providing a list of the components of an asset to a user via a user interface by retrieving the components from the database;

(c) receiving a selection of the components from the user via the user interface and storing the selection of the components;

(d) providing a list of the component properties and a list of the property values to the user via the user interface by retrieving the component properties and the property values assigned to the selection of the components from the database;

(e) receiving a selection of the property values from the user via the user interface and storing the selection of the property values;

(f) providing a list of the security controls to the user via the user interface by retrieving the security controls assigned to the selection of the components;

(g) receiving a selection of the security controls from the user via the user interface and storing the selection of the controls;

(h) generating at least one component group by assembling components comprising the selection of the components, the selection of the property values, and the selection of the controls, wherein each of the selection of components, the selection of the property values, and the selection of the security controls are the same within the at least one component group;

(i) generating a risk profile for more than one asset by repeating steps "a"-"g" for each more than one asset; and (j) monitoring changes by the user to the selection of the components, the selection of the property values, and the selection of the security controls and generating additional component groups, wherein each of the selection of components, the selection of the property values, and the selection of the security controls are the same within each of the additional component groups.

10. The one or more non-transitory computer-readable media storing instructions of claim 9, wherein said one or more non-transitory computer-readable media storing instructions further instruct the at least one processor to perform the action of generating a risk profile for more than one asset by repeating actions "a"-"h" for each more than one asset.

11. The one or more non-transitory computer-readable media storing instructions of claim 9, wherein said one or more non-transitory computer-readable media storing instructions further instruct the at least one processor to perform the action of providing component categories to a user via a user interface before performing action "a" and assigning the components to the component categories, wherein the component categories are chosen from the group consisting of backup, end user devices, infrastructure, management, medical devices, networks, people, and software.

* * * * *